US012619603B2

(12) United States Patent
Passos et al.

(10) Patent No.: US 12,619,603 B2
(45) Date of Patent: May 5, 2026

(54) GENERATING A DISTILLED GENERATIVE RESPONSE ENGINE TRAINED ON DISTILLATION DATA GENERATED WITH A LANGUAGE MODEL PROGRAM

(71) Applicant: OpenAI OpCo, LLC., San Francisco, CA (US)

(72) Inventors: Alex Tachard Passos, Sedona, AZ (US); Michael Janner, San Francisco, CA (US)

(73) Assignee: OpenAI OpCo, LLC, San Francisco, CA (US)

(*) Notice: Subject to any disclaimer, the term of this patent is extended or adjusted under 35 U.S.C. 154(b) by 0 days.

(21) Appl. No.: 18/679,525

(22) Filed: May 31, 2024

(65) Prior Publication Data

US 2025/0348482 A1 Nov. 13, 2025

Related U.S. Application Data

(60) Provisional application No. 63/645,386, filed on May 10, 2024.

(51) Int. Cl.
*G06F 16/242* (2019.01)
*G06F 16/248* (2019.01)

(52) U.S. Cl.
CPC .......... *G06F 16/243* (2019.01); *G06F 16/248* (2019.01)

(58) Field of Classification Search
CPC ............................ G06F 16/243; G06F 16/248
See application file for complete search history.

(56) References Cited

U.S. PATENT DOCUMENTS

| | | | | |
|---|---|---|---|---|
| 11,995,409 | B2 * | 5/2024 | De Ridder | G06F 40/143 |
| 12,235,912 | B1 * | 2/2025 | Anushiravani | G06F 16/3322 |
| 2016/0329043 | A1 * | 11/2016 | Kim | G10L 13/10 |
| 2020/0035228 | A1 * | 1/2020 | Seo | G06F 40/295 |
| 2020/0401770 | A1 * | 12/2020 | Paley | G06Q 10/10 |
| 2021/0142164 | A1 * | 5/2021 | Liu | G06F 40/216 |
| 2021/0182662 | A1 * | 6/2021 | Lai | G06F 40/284 |
| 2021/0224660 | A1 * | 7/2021 | Song | G06N 3/045 |
| 2021/0342380 | A1 * | 11/2021 | Luus | G06N 3/042 |
| 2022/0067278 | A1 * | 3/2022 | Huang | G06F 40/258 |
| 2022/0114476 | A1 * | 4/2022 | Bui | G06N 3/044 |
| 2022/0197951 | A1 * | 6/2022 | Stober | G06F 16/904 |
| 2022/0292139 | A1 * | 9/2022 | Mass | G06F 16/3329 |
| 2022/0335303 | A1 * | 10/2022 | Haidar | G06N 3/096 |
| 2023/0004568 | A1 * | 1/2023 | Wu | G06N 5/041 |
| 2023/0177097 | A1 * | 6/2023 | Boymel | G06N 20/00 707/706 |
| 2023/0252224 | A1 * | 8/2023 | Tran | G06F 40/56 715/256 |
| 2023/0418848 | A1 * | 12/2023 | Clinchant | G06F 40/40 |

(Continued)

*Primary Examiner* — Michael N Opsasnick
(74) *Attorney, Agent, or Firm* — Polsinelli PC

(57) ABSTRACT

The present technology provides a distilled generative response engine for generating responses to Internet search queries. The present technology utilizes a language model program that is made up of a collection of conditional dependencies that branch into many different sequences of prompts that are configured to transform answers to different types of search queries. This design of the language model program facilitates rapid iteration to improve responses. The language model program is used to generate distillation data that is used to train the distilled generative response engine.

21 Claims, 11 Drawing Sheets

(56) References Cited

U.S. PATENT DOCUMENTS

| | | | | |
|---|---|---|---|---|
| 2024/0104346 | A1* | 3/2024 | Hou | G06N 3/045 |
| 2024/0119267 | A1* | 4/2024 | Kierat | G06N 3/045 |
| 2024/0185086 | A1* | 6/2024 | Hou | G06N 3/096 |
| 2025/0005050 | A1* | 1/2025 | Krishnan | G06F 16/243 |
| 2025/0086647 | A1* | 3/2025 | Gao | G06Q 30/015 |
| 2025/0217371 | A1* | 7/2025 | Hamid | G06F 40/174 |
| 2025/0251916 | A1* | 8/2025 | Lawler | G06F 8/35 |
| 2025/0315609 | A1* | 10/2025 | Kosslyn | G06F 40/56 |

* cited by examiner

Obtaining Search Results From a Search Index 302

Identifying Relevant Search Results From the Search Results 304

Providing an Initial Prompt to the Generative Response Engine Along With at Least One Guiding Prompt From the Language Model Program 306

NO

Is the Language Model Program Complete? 308

YES

Receiving a Final Response From the Generative Response Engine 310

Storing the Final Response as Distillation Data 312

Performing a Language Model Distillation by Training the Generative Response Engine to Produce the Final Response From the Initial Prompt Without the Benefit of the at Least One Guiding Prompt From the Language Model Program 314

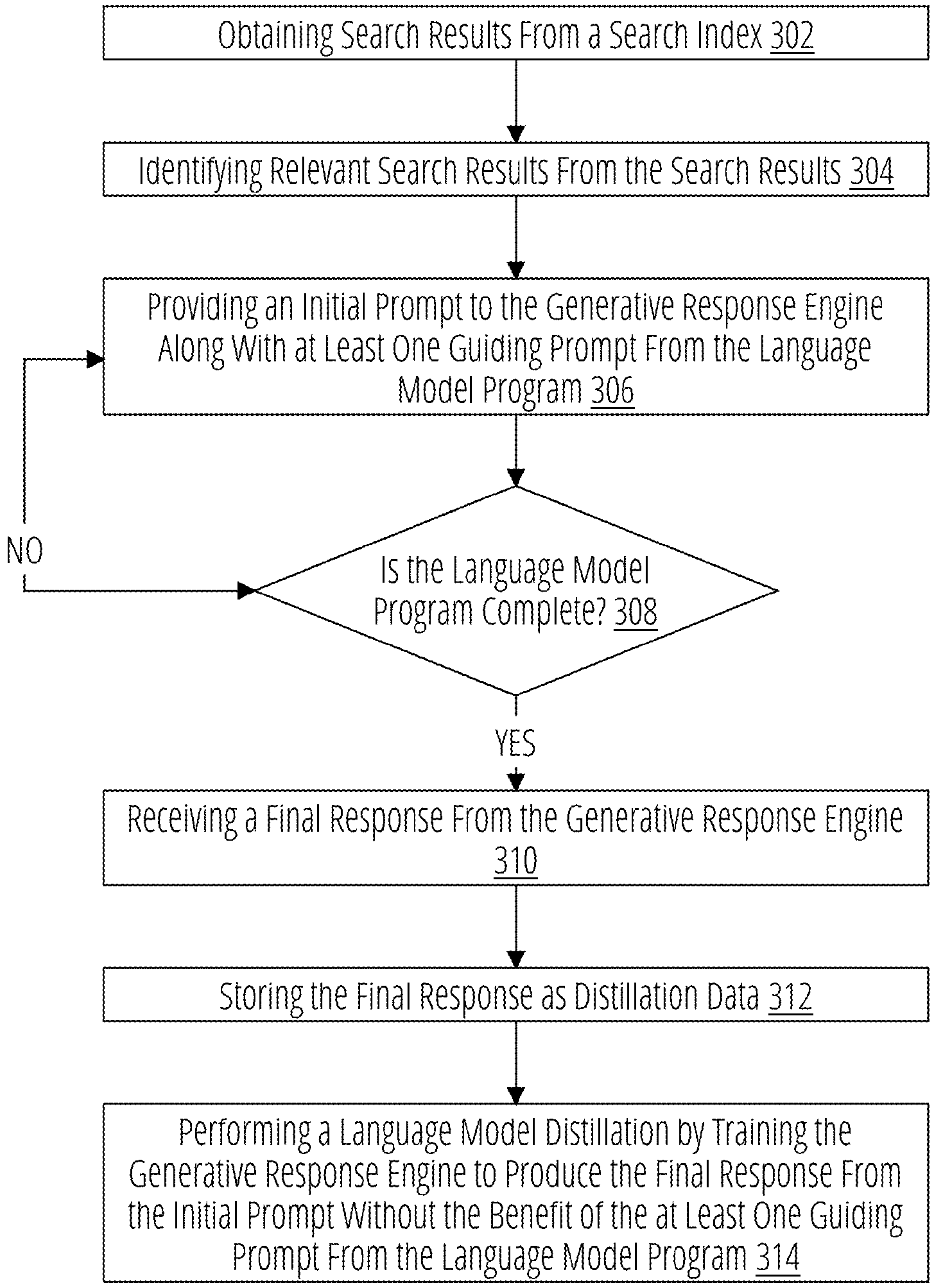

FIG. 3

Build response incrementally

1. Select sources
   [8]

2. Write headers
   ### Oganesson

3. Write section contents
   ### Oganesson
   Oganesson, with the atomic number 118, is the
   heaviest element with an atomic mass of 290 u.

4. Insert citations
   ### Oganesson
   Oganesson, with the atomic number 118, is the
   heaviest element with an atomic mass of 290 u [8].

Iteratively refine response

5. Add Context
   ### Oganesson
   Oganesson, with the atomic number 118, is the heaviest
   element with an atomic mass of 290 u [8]. It was first
   synthesized in 2002 at the Joint Institute for Nuclear
   Research in Dubna, Russia.

6. Translate
   ### Oganesson
   Oganesson, com o número atômico 118, é o elemento mais
   pesado com uma massa atômica de 290 u [8]. Foi sintetizado
   pela primeira vez em 2002 no Instituto Conjunto para Pesquisa
   Nuclear em Dubna, Rússia.

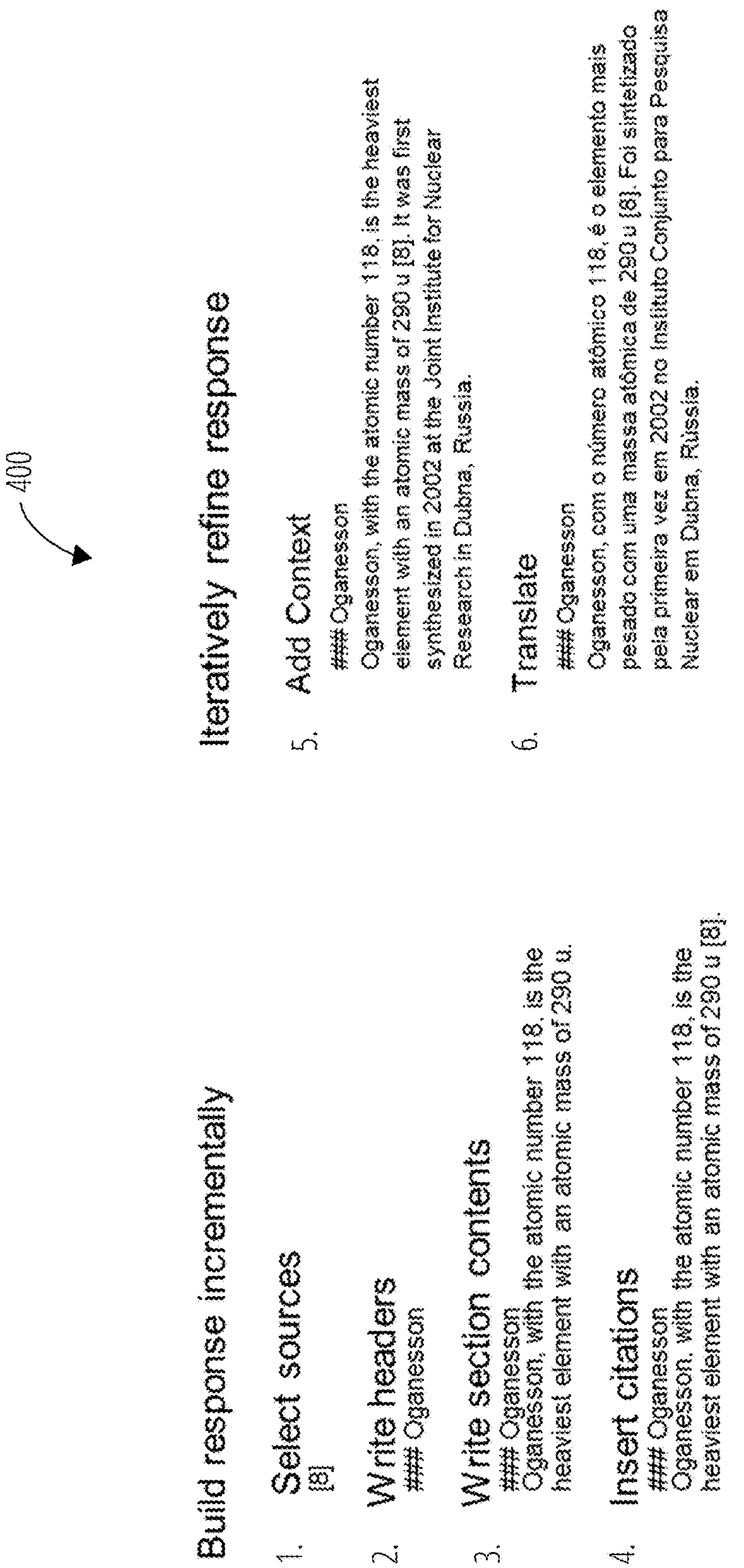

FIG. 4

1. Core
2. Bullet points
3. Coding
4. Content
5. Named entities & disambiguation
6. How-to
7. Media & recommendations
8. Navigational
9. Source selection and citations
10. Style & tone
11. Technical
12. Temporal
13. Tool use
14. Weather

- Directness
- Don't respond with "As an LLM…"
- Don't apologize for inadequate sources
- Don't write anything that could be construed as an ad

GENERATING A DISTILLED GENERATIVE RESPONSE ENGINE TRAINED ON DISTILLATION DATA GENERATED WITH A LANGUAGE MODEL PROGRAM

CROSS-REFERENCE TO RELATED APPLICATIONS

This application claims the benefit of priority to U.S. provisional application No. 63/645,386, filed on May 10, 2024, entitled GENERATING A DISTILLED GENERATIVE RESPONSE ENGINE TRAINED ON DISTILLATION DATA GENERATED WITH A LANGUAGE MODEL, which is expressly incorporated by reference herein in its entirety.

BACKGROUND

Generative response engines such as large language models represent a significant milestone in the field of artificial intelligence, revolutionizing computer-based natural language understanding and generation. Generative response engines, powered by advanced deep learning techniques, have demonstrated astonishing capabilities in tasks such as text generation, translation, summarization, and even code generation. Generative response engines can sift through vast amounts of text data, extract context, and provide coherent responses to a wide array of queries.

One task to which generative response engines have recently been applied is to interface with a search engine to summarize search results. This is a powerful use case because it can potentially help a user avoid having to review numerous search results to find the information that the user is ultimately seeking.

BRIEF DESCRIPTION OF THE SEVERAL VIEWS OF THE DRAWINGS

Details of one or more embodiments of the subject matter described in this disclosure are set forth in the accompanying drawings and the description below. However, the accompanying drawings illustrate only some typical embodiments of this disclosure and are therefore not to be considered limiting of its scope. Other features, embodiments, and advantages will become apparent from the description, the drawings, and the claims.

FIG. 3 illustrates an example routine for generating a distilled generative response engine using a language model program to generate distillation data in accordance with some embodiments of the present technology.

FIG. 4 illustrates a conceptual outline of a language model program for using a generative response engine to generate responses to search queries and transformations to the response as a result of prompts provided by the language model program in accordance with some embodiments of the present technology.

FIG. 5B illustrates example prompts from a language model program to cause response transformations in accordance with some embodiments of the present technology.

DETAILED DESCRIPTION

Figure 1:
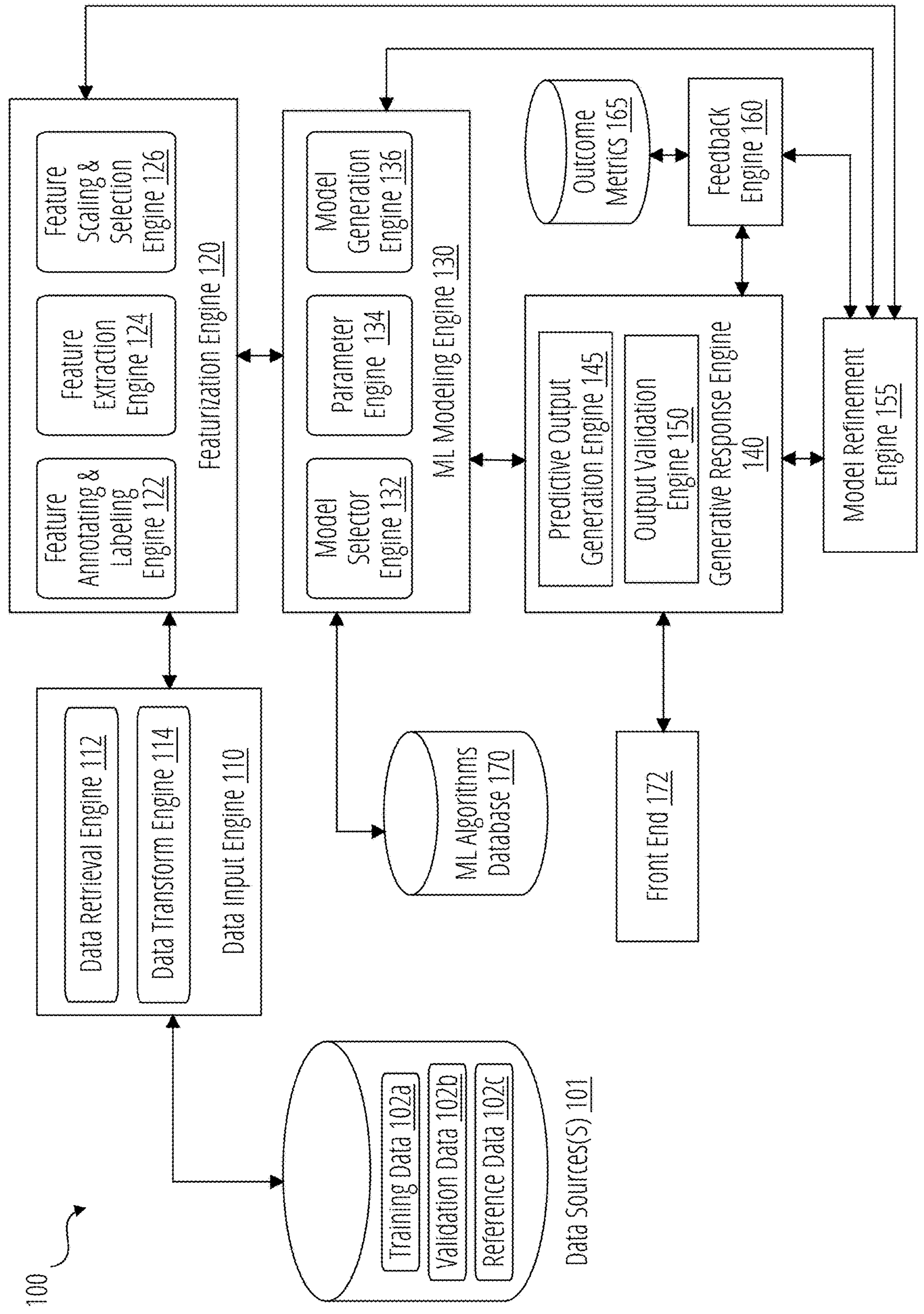
FIG. 1 is a block diagram illustrating an exemplary machine learning platform for implementing various embodiments of this disclosure in accordance with some embodiments of the present technology.

Generative response engines such as large language models represent a significant milestone in the field of artificial intelligence, revolutionizing computer-based natural language understanding and generation. Generative response engines, powered by advanced deep learning techniques, have demonstrated astonishing capabilities in tasks such as text generation, translation, summarization, and even code generation. However, despite their remarkable linguistic prowess, these generative response engines operate on a foundation of publicly available information and do not possess personal information about individual users.

One task to which generative response engines have recently been applied is to interface with a search engine to summarize search results. This is a powerful use case because it can potentially help a user avoid having to review numerous search results to find the information that the user is ultimately seeking.

However, simply utilizing a generative response engine to summarize search results or to extract an answer from search results leaves many problems to be solved before the technology can provide a good user experience to everyday users.

One limitation is that base models of generative response engines are not particularly fast when asked to review search results and provide an answer based on the search results. Meanwhile, users expect Internet searches to be fast. We are conditioned by years search engines use to see search response times in the range of fractions of a second. Meanwhile, some searches combined with summarization with a generative response engine can take upwards of 10 seconds, which is too slow for many users.

Speed is especially important because sometimes users need some trial and error before figuring out how to provide a search query that yields relevant search results. Therefore, results need to be provided quickly so that a user can iterate quickly.

The present technology attempts to address these challenges by first providing a distilled generative response engine, which is a smaller, faster version of a base model of a generative response engine. The distilled generative response engine can be trained specifically to generate answers from search results.

Secondly, the present technology can evaluate a search query and determine that it should be revised to yield better search results. In this way, the present technology can reduce the iterations needed to achieve the results they are seeking.

When the possibility that a user will need to perform fewer revisions of their search queries is combined with response times measured in single-digit seconds, users might consider this an acceptable experience even though the search response time is slower than they are accustomed to.

However, achieving these solutions is not easy. Not all Internet searches are alike. The answer to a question about the weather or sports scores should not be presented and summarized the same as an answer to a question about current events, vacation ideas, or a scientific or technical concept. Therefore, training the distilled generative response engine is a challenging task. There needs to be an ability to train the distilled generative response engine to provide answers suitable for the question, and there needs to be a way to generate distillation data in a reliable way that does not harm answers to other topics.

The types of responses a user might request from the Internet are nearly limitless, and as the content on the Internet is ever-evolving, so too are the types of questions that might be asked of a search interface that provides responses grounded in search results found in a search index. This creates a challenge of how to generate training data from a based model for nuanced questions and responses without harming training data for other types of questions and responses.

The present technology addresses this problem through the use of an innovative design of a language model program. Whereas language model programs are generally a somewhat simple series of prompts, the present technology utilizes a language model program that is made up of a collection of conditional dependencies that branch into many different sequences of prompts that are configured to generate answers to different types of search queries. This design of the language model program facilitates rapid iteration to improve responses. This design also facilitates targeted improvements since changes can be made that are specific to particular conditional branches that will leave responses generated from other branches unmodified. These benefits are important since the information searched for in a search engine changes rapidly—as do users' preferences for how to view some types of information. Accordingly, a method for creating the distilled generative response engine needs to be flexible and facilitate the rapid generating of distillation data and quick updates to the training of the distilled generative response engine.

The present description will address these and other details of the present technology.

FIG. 1 is a block diagram illustrating an example machine learning platform for implementing various embodiments of this disclosure in accordance with some embodiments of the present technology. Although the example system depicts particular system components and an arrangement of such components, this depiction is to facilitate a discussion of the present technology and should not be considered limiting unless specified in the appended claims. For example, some components that are illustrated as separate can be combined with other components, and some components can be divided into separate components.

System 100 may include data input engine 110 that can further include data retrieval engine 112 and data transform engine 114. Data retrieval engine 112 may be configured to access, interpret, request, or receive data, which may be adjusted, reformatted, or changed (e.g., to be interpretable by another engine, such as data input engine 110). For example, data retrieval engine 112 may request data from a remote source using an application programming user interface (API). Data input engine 110 may be configured to access, interpret, request, format, re-format, or receive input data from data sources(s) 101. For example, data input engine 110 may be configured to use data transform engine 114 to execute a re-configuration or other change to data, such as a data dimension reduction. In some embodiments, data sources(s) 101 may be associated with a single entity (e.g., organization) or with multiple entities. Data sources(s) 101 may include one or more of training data 102*a* (e.g., input data to feed a machine learning model as part of one or more training processes), validation data 102*b* (e.g., data against which at least one processor may compare model output with, such as to determine model output quality), and/or reference data 102*c*. In some embodiments, data input engine 110 can be implemented using at least one computing device. For example, data from data sources(s) 101 can be obtained through one or more I/O devices and/or network interfaces. Further, the data may be stored (e.g., during execution of one or more operations) in a suitable storage or system memory. Data input engine 110 may also be configured to interact with a data storage, which may be implemented on a computing device that stores data in storage or system memory.

System 100 may include featurization engine 120. Featurization engine 120 may include feature annotating & labeling engine 122 (e.g., configured to annotate or label features from a model or data, which may be extracted by feature extraction engine 124), feature extraction engine 124 (e.g., configured to extract one or more features from a model or data), and/or feature scaling & selection engine 126 Feature scaling & selection engine 126 may be configured to determine, select, limit, constrain, concatenate, or define features (e.g., AI features) for use with AI models.

System 100 may also include machine learning (ML) ML modeling engine 130, which may be configured to execute one or more operations on a machine learning model (e.g., model training, model re-configuration, model validation, model testing), such as those described in the processes described herein. For example, ML modeling engine 130 may execute an operation to train a machine learning model, such as adding, removing, or modifying a model parameter. Training of a machine learning model may be supervised, semi-supervised, or unsupervised. In some embodiments, training of a machine learning model may include multiple epochs, or passes of data (e.g., training data 102*a*) through a machine learning model process (e.g., a training process). In some embodiments, different epochs may have different degrees of supervision (e.g., supervised, semi-supervised, or unsupervised). Data into a model to train the model may include input data (e.g., as described above) and/or data previously output from a model (e.g., forming a recursive learning feedback). A model parameter may include one or more of a seed value, a model node, a model layer, an algorithm, a function, a model connection (e.g., between other model parameters or between models), a model constraint, or any other digital component influencing the output of a model. A model connection may include or represent a relationship between model parameters and/or models, which may be dependent or interdependent, hierarchical, and/or static or dynamic. The combination and configuration of the model parameters and relationships between model parameters discussed herein are cognitively infeasible for the human mind to maintain or use. Without limiting the disclosed embodiments in any way, a machine learning model may include millions, billions, or even trillions of model parameters. ML modeling engine 130 may include model selector engine 132 (e.g., configured to select a model from among a plurality of models, such as based on input data), parameter engine 134 (e.g., configured to add, remove, and/or change one or more parameters of a model), and/or model generation engine 136 (e.g., configured to generate one or more machine learning models, such as according to model input data, model output data, comparison data, and/or validation data).

In some embodiments, model selector engine 132 may be configured to receive input and/or transmit output to ML algorithms database 170. Similarly, featurization engine 120 can utilize storage or system memory for storing data and can utilize one or more I/O devices or network interfaces for transmitting or receiving data. ML algorithms database 170 may store one or more machine learning models, any of which may be fully trained, partially trained, or untrained. A machine learning model may be or include, without limitation, one or more of (e.g., such as in the case of a metamodel) a statistical model, an algorithm, a neural network (NN), a convolutional neural network (CNN), a generative neural network (GNN), a Word2Vec model, a bag of words model, a term frequency-inverse document frequency (tf-idf) model, a GPT (Generative Pre-trained Transformer) model (or other autoregressive model), a Proximal Policy Optimization (PPO) model, a nearest neighbor model (e.g., k nearest neighbor model), a linear regression model, a k-means clustering model, a Q-Learning model, a Temporal Difference (TD) model, a Deep Adversarial Network model, or any other type of model described further herein. Two specific examples of machine learning models that can be stored in the ML algorithms database 170 include versions DALL•E and CHAT GPT, both provided by OPEN AI.

System 100 can further include generative response engine 140 that is made up of a predictive output generation engine 145, output validation engine 150 (e.g., configured to apply validation data to machine learning model output). Predictive output generation engine 145 can be configured to receive inputs from front end 172 that provide some guidance as to a desired output. Predictive output generation engine 145 can analyze the input and identify relevant patterns and associations in the data it has learned to generate a sequence of words that predictive output generation engine 145 predicts is the most likely continuation of the input using one or more models from the ML algorithms database 170, aiming to provide a coherent and contextually relevant answer. Predictive output generation engine 145 generates responses by sampling from the probability distribution of possible words and sequences, guided by the patterns observed during its training. In some embodiments, predictive output generation engine 145 can generate multiple possible responses before presenting the final one. Predictive output generation engine 145 can generate multiple responses based on the input, and these responses are variations that predictive output generation engine 145 considers potentially relevant and coherent. Output validation engine 150 can evaluate these generated responses based on certain criteria. These criteria can include relevance to the prompt, coherence, fluency, and sometimes adherence to specific guidelines or rules, depending on the application. Based on this evaluation, output validation engine 150 selects the most appropriate response. This selection is typically the one that scores highest on the set criteria, balancing factors like relevance, informativeness, and coherence.

System 100 can further include feedback engine 160 (e.g., configured to apply feedback from a user and/or machine to a model) and model refinement engine 155 (e.g., configured to update or re-configure a model). In some embodiments, feedback engine 160 may receive input and/or transmit output (e.g., output from a trained, partially trained, or untrained model) to outcome metrics database 165. Outcome metrics database 165 may be configured to store output from one or more models and may also be configured to associate output with one or more models. In some embodiments, outcome metrics database 165, or other device (e.g., model refinement engine 155 or feedback engine 160), may be configured to correlate output, detect trends in output data, and/or infer a change to input or model parameters to cause a particular model output or type of model output. In some embodiments, model refinement engine 155 may receive output from predictive output generation engine 145 or output validation engine 150. In some embodiments, model refinement engine 155 may transmit the received output to featurization engine 120 or ML modeling engine 130 in one or more iterative cycles.

The engines of system 100 may be packaged functional hardware units designed for use with other components or a part of a program that performs a particular function (e.g., of related functions). Any or each of these modules may be implemented using a computing device. In some embodiments, the functionality of system 100 may be split across multiple computing devices to allow for distributed processing of the data, which may improve output speed and reduce computational load on individual devices. In some embodiments, system 100 may use load-balancing to maintain stable resource load (e.g., processing load, memory load, or bandwidth load) across multiple computing devices and to reduce the risk of a computing device or connection becoming overloaded. In these or other embodiments, the different components may communicate over one or more I/O devices and/or network interfaces.

System 100 can be related to different domains or fields of use. Descriptions of embodiments related to specific domains, such as natural language processing or language modeling, is not intended to limit the disclosed embodiments to those specific domains, and embodiments consistent with the present disclosure can apply to any domain that utilizes predictive modeling based on available data.

Figure 2:
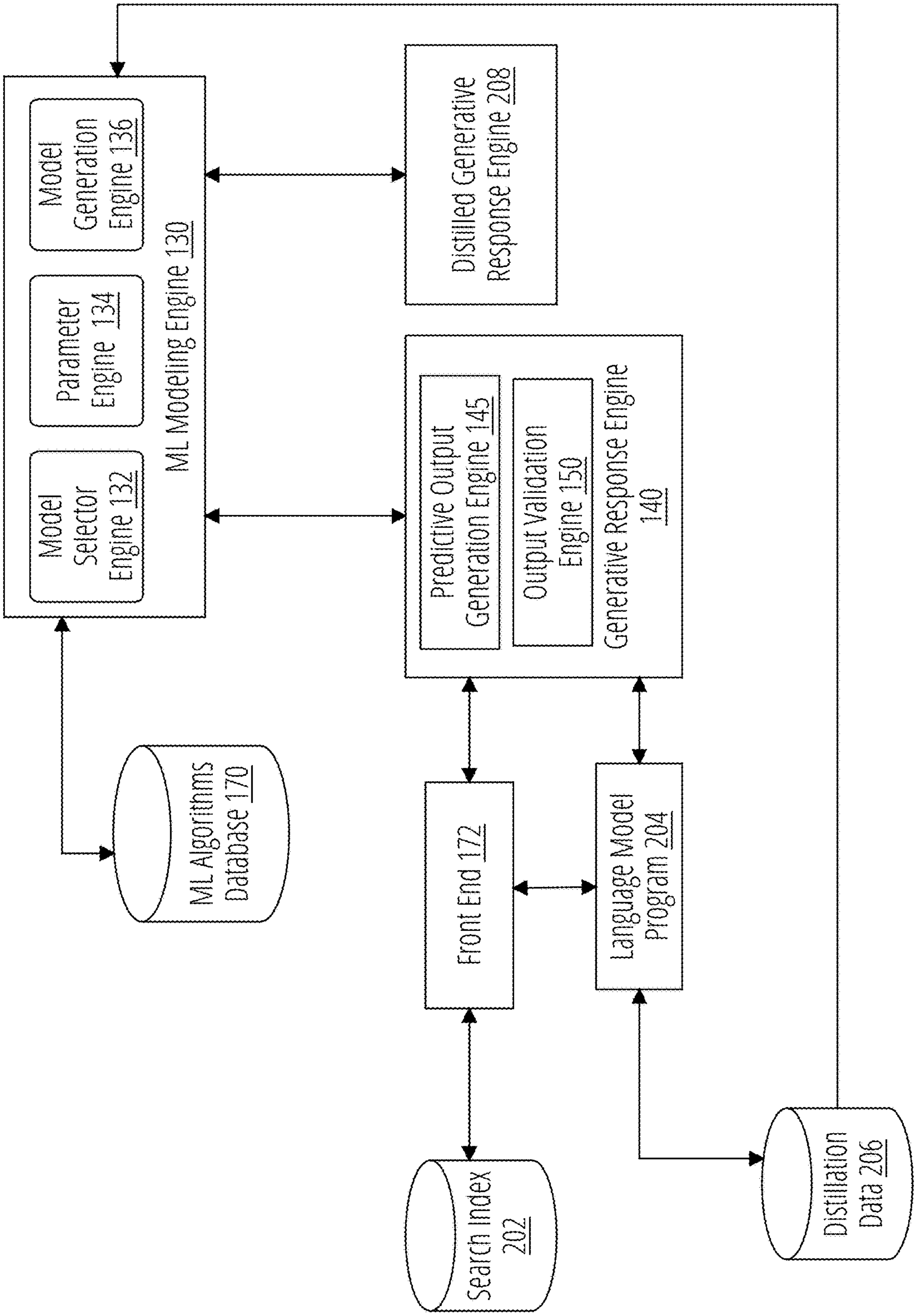
FIG. 2 is a block diagram illustrating an example machine learning platform for interfacing with a search index and generating a distilled generative response engine in accordance with some embodiments of the present technology.

FIG. 2 is a block diagram illustrating an example machine learning platform for interfacing with a search index and generating a distilled generative response engine in accordance with some embodiments of the present technology. Although the example system depicts particular system components and an arrangement of such components, this depiction is to facilitate a discussion of the present technology and should not be considered limiting unless specified in the appended claims. For example, some components that are illustrated as separate can be combined with other components, and some components can be divided into separate components.

In particular, FIG. 2 includes several overlapping elements from FIG. 1, which are shown with some additional system components. For example, front end 172 is shown as having an interface to search index 202. Search index 202 is an Internet search index such as might be used by a search engine to identify search results in response to a search query. Front end 172 can be adapted to receive a search query, send it to search index 202, and receive search results from search index 202. Although FIG. 2 illustrates that front end 172 interacts directly with search index 202, it will be appreciated by those of ordinary skill in the art that front end 172 might interact with one or more intermediate services in order to provide a search query to search index 202.

Front end 172 is further adapted to provide the search results to generative response engine 140 to receive a summarization of the search results, or an answer to a question for which the search results are source material for formulating an answer to the question. In some embodiments, the search results might be provided to generative response engine 140 through another service and may or might not use front end 172 as an intermediary. The key concept that is illustrated is that front end 172 receives a search query, and search results are obtained from search index 202 that are responsive to the search query. The search results are then used by generative response engine 140 to generate a response to the search query.

As addressed above, the present technology utilizes a distilled generative response engine during normal commercial use, but FIG. 2 illustrates a system for creating the distilled generative response engine. In order to create responses suitable for creating the distilled generative response engine, the present technology utilizes language model program 204 to guide generative response engine 140 to provide quality responses to the search query. Additional detail on the language model program 204 is addressed with respect to FIG. 4, FIG. 5A, and FIG. 5B.

Responses to search queries provided by generative response engine 140 (and that are the result of prompts provided by language model program 204) along with the search queries can be saved as distillation data 206. The distillation data 206 can be used to train a version of generative response engine 140 into distilled generative response engine 208. More specifically, search queries and responses generated by generative response engine 140 as guided by language model program 204 to produce quality responses to search queries are the distillation data 206. The ML modeling engine 130 can use the distillation data 206 to distill generative response engine 140 into distilled generative response engine 208.

A distilled generative response engine refers to a machine learning model that is trained to mimic responses generated by generative response engine 140 for a specific use case where distilled generative response engine 208 is a smaller model with faster performance. Model distillation is a process where knowledge is transferred from a larger, complex model (such as generative response engine 140) to a smaller, simpler model without significantly compromising on performance. This technique can make the model more efficient, requiring less computational resources for both training and inference. The distilled model aims to preserve the essential information and decision-making capabilities of the original model while being more accessible and faster to use. Distillation involves training the distilled generative response engine 208 to mimic the output of the generative response engine 140. In this case, the capabilities of distilled generative response engine 208 are configured for the specific purpose of providing responses to search queries from web search results.

FIG. 3 illustrates an example routine for generating a distilled generative response engine using a language model program to generate distillation data in accordance with some embodiments of the present technology. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

As introduced above, a user can provide a search query into front end 172, which results in a search of search index 202. According to some examples, the method includes obtaining the search results from a search index at block 302. For example, generative response engine 140 illustrated in FIG. 1 may obtain search results from a search index 202.

According to some examples, the method includes identifying relevant search results from the search results received from the search index at block 304. For example, generative response engine 140 illustrated in FIG. 2 may receive some number of the search results and the search query and identify relevant search results. In some embodiments, generative response engine 140 might receive the top 3, 5, 10, 20 search results and consider these as being the most relevant search results based on a ranking from the search index. In some embodiments, generative response engine 140 can analyze the contents from the search results to determine which have content that is responsive to the search query.

As introduced above, there are many types of search queries, and the way a response to one search query should be composed might be different from the way a response to another search query should be composed. For example, the answer to a question about the weather or sports scores should not be presented and summarized the same as an answer to a question about current events, vacation ideas, or a scientific or technical concept. For this reason, simply asking generative response engine 140 to summarize the search results, or to provide a response to the search query based on the search results, might not be optimal. Generative response engine 140 is a base model suitable as a general purpose response engine that is very good at a wide variety of tasks, but specific tasks can be done better, and often quicker, by more focused response engines.

One way to cause generative response engine 140 to output responses that are responsive to a search query and that uses the search results to formulate the responses is to use a language model program to guide generative response engine 140 to produce answers that are well suited to the search query.

A language model program is a framework or system that utilizes a generative response engine such as generative response engine 140 to generate, modify, or evaluate responses according to given inputs. The language model program, in this scenario, acts as an interface or mediator that interprets queries or prompts, and formulates them in a way the underlying LLM can understand, and then processes the generative response engine's output to ensure that it meets certain criteria such as relevance, appropriateness, and factual accuracy. In some embodiments, the language model program may be a separately executable program. In some embodiments, the language model program is a collection of steps and determinations performed by generative response engine 140.

The language model program can utilize prompt engineering and response filtering techniques. In some embodiments, the language model program can provide a prompt along with the search results and the search query to generative response engine 140 and receive an initial response. The language model program can then offer another prompt to the generative response engine 140 to improve the response further. The language model program is constructed to guide the creation of responses by generative response engine 140, which leverages the foundational language understanding and generation capacities of generative response engine 140 while also applying additional layers of refinement and control to tailor the output to specific applications.

However, since the language model program ultimately provides a series of prompts to generative response engine 140, the process of generating a final response is slow and expensive to create because it requires multiple prompt and response cycles with generative response engine 140. Generative response engine 140 can be a large language model that is expensive in terms of processing resources, power, time, and ultimately financial expenditure to run. For this reason, it is not an acceptable solution to utilize generative response engine 140 with language model program 204 for servicing everyday Internet searches. But as described herein, the use of generative response engine 140 with language model program 204 to generate distillation data 206 to train a faster model is an acceptable use of these technologies.

According to some examples, the method includes providing an initial prompt to the generative response engine along with at least one guiding prompt from a language model program at block 306. For example, the language model program 204 illustrated in FIG. 2 may provide an initial prompt, made up of at least the search query and relevant search results, to the generative response engine along with at least one guiding prompt from the language model program. FIG. 4 illustrates a high-level example of a language model program and some transformations that result from the language model program.

According to some examples, the method includes determining whether the language model program is complete at decision block 308. For example, the language model program 204 illustrated in FIG. 2 may determine whether the response received from the generative response engine 140 is complete, or whether the language model program has additional prompts to provide to the generative response engine 140 to improve the generated response.

Figure 5A:
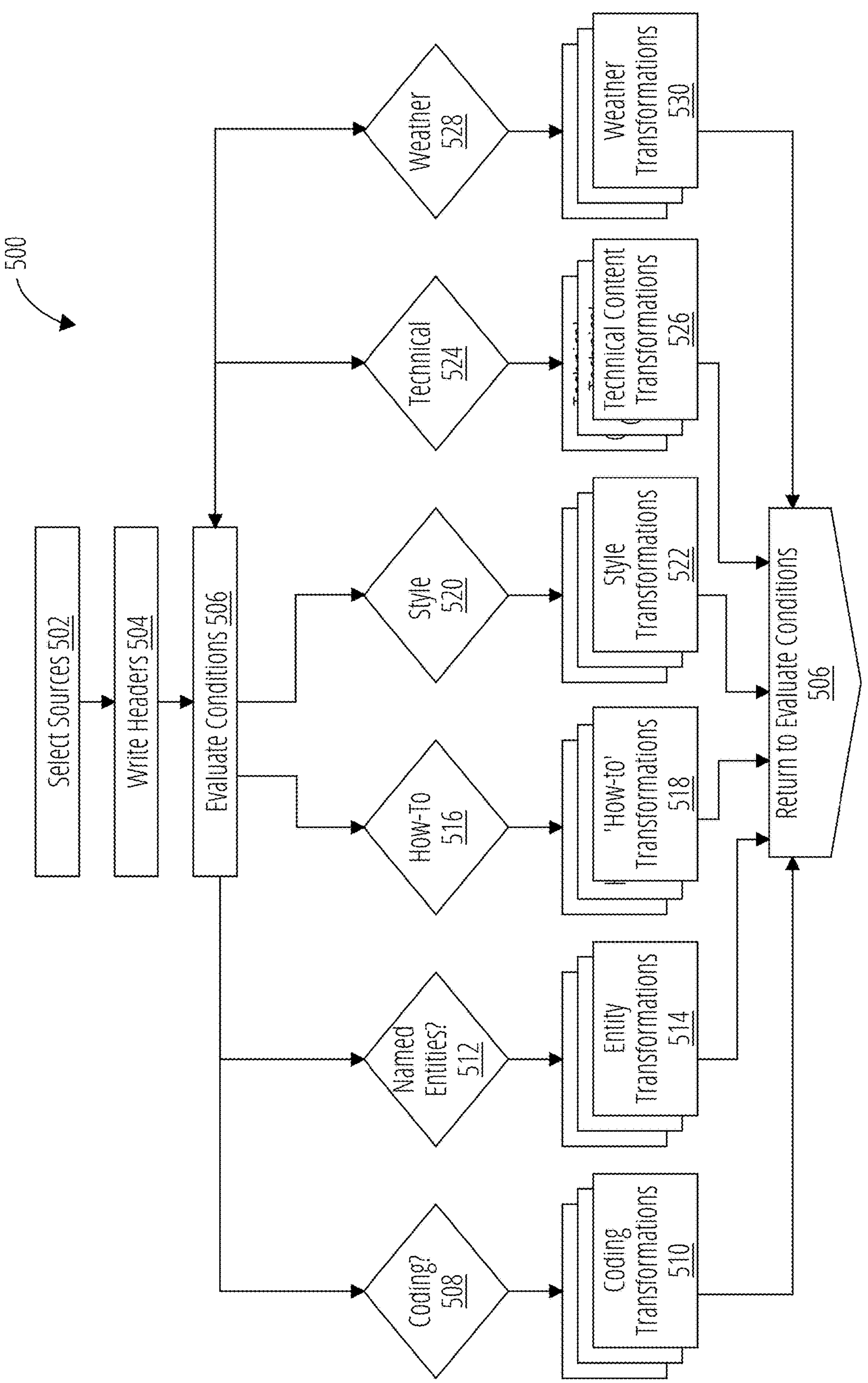
FIG. 5A and FIG. 5B illustrate an example of a language model program that is organized into a tree of conditional transformations in accordance with some embodiments of the present technology.
Figure 5B:
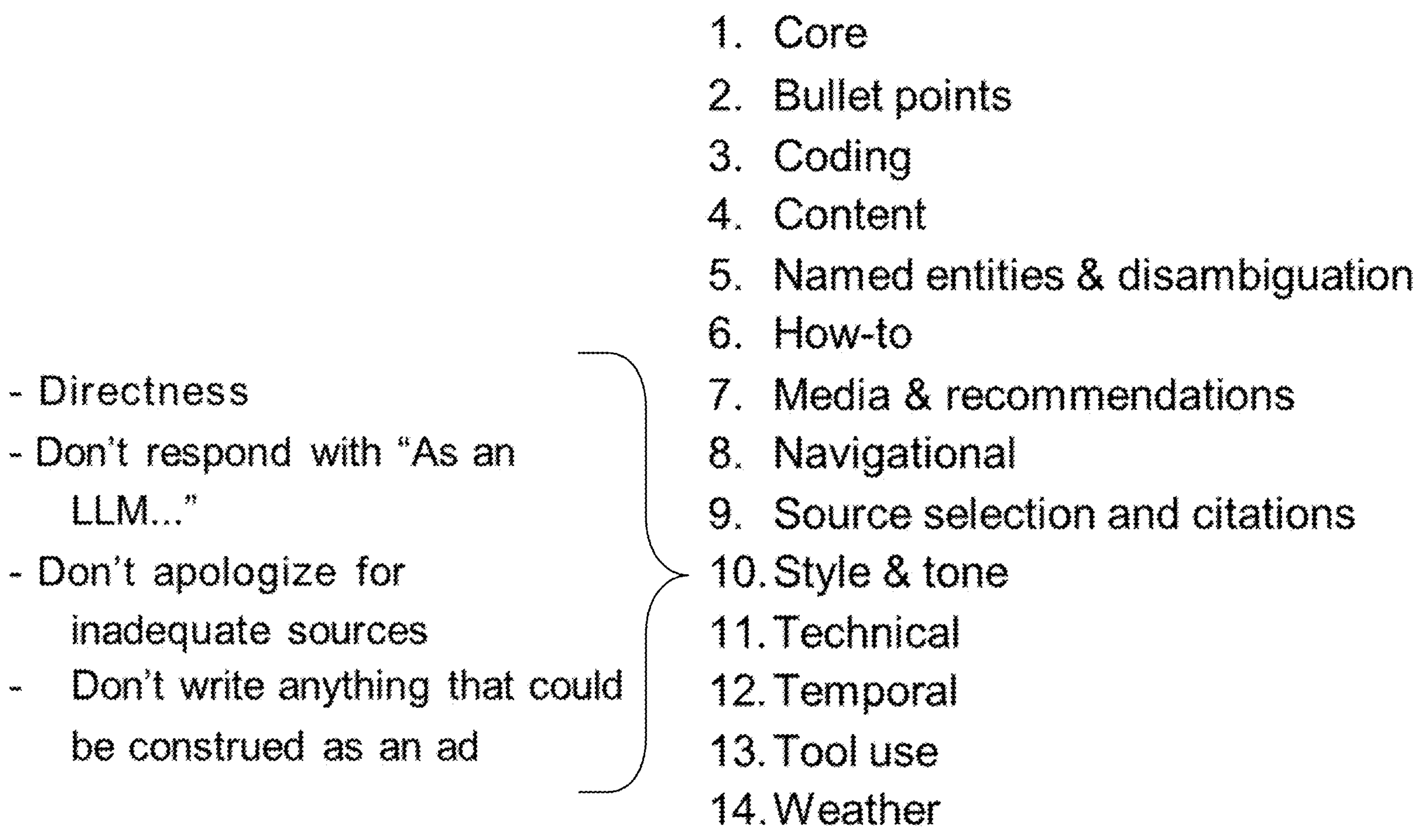

In some embodiments, the language model program is organized into a collection of conditional transformations whereby the language model program is organized into a tree of prompts configured to transform generated responses provided by the generative response engine 140 into better responses based on the context of the generated response and/or the search query. Accordingly, language model program 204 can determine if the response meets any conditions and can guide generative response engine 140 through prompts associated with that condition. FIG. 5A and FIG. 5B addresses a language model program 204 that is organized into a collection of conditional transformations that are applied to improving and transforming responses relevant to search queries in greater detail.

Organizing language model program 204 in a tree of conditional transformations provides a benefit that when revisions need to be made to the language model program, the revisions can be targeted at improving specific types of search queries. As a person of ordinary skill in the art will appreciate there can be many types of searches and responses to searches can have any number of characteristics. It can be desirable to improve the responses generated using the language model program in a targeted manner without disrupting responses with other characteristics.

Once the language model program is complete, the method includes receiving a final response from the generative response engine at block 310. For example, the language model program 204 illustrated in FIG. 2 may receive a final response from the generative response engine.

According to some examples, the method includes storing the final response as distillation data at block 312. For example, the language model program 204 illustrated in FIG. 2 may store the final response as distillation data 206.

The distillation data 206 can be used to train a new model—distilled generative response engine 208. According to some examples, the method includes performing a language model distillation by training distilled generative response engine 208 to produce the final response from the initial prompt without the benefit of at least one guiding prompt from the language model program at block 314. For example, the model generation engine 136 illustrated in FIG. 1 may perform a language model distillation by training the distilled generative response engine 208 to produce the final response from the initial prompt without the benefit of at least one guiding prompt from the language model program. The final response is used as distillation data. The result of the language model distillation is distilled generative response engine 208.

FIG. 4 illustrates a conceptual outline of a language model program for using a generative response engine to generate responses to search queries and transformations to the response as a result of prompts provided by the language model program in accordance with some embodiments of the present technology. FIG. 4 illustrates an example of language model program 400, which is a simplified example of language model program 204.

As illustrated in FIG. 4 the language model program 400 includes 6 steps. In reality, a suitable language model program would be much longer than 6 steps and is organized into a tree of conditional logic as addressed further in FIG. 5A and FIG. 5B.

First, language model program 400 instructs generative response engine 140 to select relevant search results as sources from which to construct the response. In this example, the search query was to determine information about the element Organesson.

Second, language model program 400 instructs generative response engine 140 to write headers. As illustrated in FIG. 4, the heading is Organesson. While this example only has one header, there could be many.

Third, language model program 400 instructs generative response engine 140 to write section contents, which includes language that is directly responsive to the search query.

Fourth, language model program 400 instructs generative response engine 140 to provide citations to the specific web pages from the relevant search results from which the answer was derived.

Fifth, Language model program 400 instructs Generative Response Engine 140 provide additional context to the response.

Sixth, if the query needs to be translated into another language, language model program 400 instructs generative response engine 140 to translate the response.

As indicated above, language model program 400 is just a conceptual example. In reality, language model program 204 is more complex and utilizes conditional statements to make transformations appropriate to the response.

FIG. 5A and FIG. 5B illustrate an example of a language model program that is organized into a tree of conditional transformations in accordance with some embodiments of the present technology. In particular, FIG. 5A and FIG. 5B illustrates an example language model program 500, which is a simplified example of language model program 204.

Language model program 500 is organized into a tree of transformations, wherein some transformations are utilized for every response and some transformations are applied when certain conditions are met.

The transformations are revisions to a response provided by generative response engine 140 using the search query and relevant search results as a prompt. The transformations are caused by additional prompts supplied to generative response engine 140 by language model program 500, which prompts cause generative response engine 140 to revise the current response.

Since the language model program ultimately provides a series of prompts to generative response engine 140, the process of generating a final response is slow and expensive to create because it requires multiple prompt and response cycles with generative response engine 140. Generative response engine 140 can be a large language model that is expensive in terms of processing resources, power, time, and ultimately, financial expenditure to run.

The prompts provided by language model program 500 can be configured to encourage generative response engine 140 to transform the current response in a particular way or based on a factor(s). The prompts provided by language model program 500 can also include constraints to cause the generative response engine 140 ensure that the current response fits a desired tone, style, length, etc. The prompts provided by language model program 500 might include templates for the current response such as tables for sports scores or weather forecasts, or summaries and detailed responses for complex concepts, etc. These are just example categories of prompts, but prompts can be used to transform a current response into a response that the creator of the language model program 500 believes is a better response for the search query.

Language model program 500 shows prompt 502 for selecting sources and transformation 504 to revise the current response to write headers for the response. These correspond to the first and second steps shown in FIG. 4. In some embodiments, prompt 502 and transformation 504 provided by language model program 500 are used to generate all responses.

Language model program 500 also shows a block 506 which is an operation to evaluate on or more conditions, which when satisfied can result in exploring one or more branches of the tree of transformations that are part of language model program 500. For example, FIG. 5A shows decision nodes to determine whether one or more conditions apply. When language model program 500 or generative response engine 140 as instructed by language model program 500 determine that the response pertains to a condition of a relevant decision node, the language model program 500 can proceed to prompt generative response engine 140 to apply one or more transformations relevant to the condition that is the subject of that branch of the tree of transformations.

For example, decision node 508 determines if a portion of the response should include code, and if it is determined that the response applies to coding, language model program 500 can provide prompts effective to carry out one or more coding transformations 510.

For example, decision node 512 to determine if a portion of the response pertains to named entities, and if it is determined that the response applies to named entities, language model program 500 can provide prompts effective to carry out one or more entity transformations 514.

For example, decision node 516 to determine if the response should be written in a 'how-to' style, and if it is determined that the response applies the 'how-to' style, language model program 500 can provide prompts effective to carry out one or more 'how-to' transformations 518.

For example, decision node 520 determines whether to transform the style of the response. If it is determined that the response should have the style transformed, language model program 500 can provide prompts effective for carrying out one or more style transformations 522.

For example, decision node 524 to determine if the response when the subject of the response is technical in nature, and if it is determined that the response applies technical content, language model program 500 can provide prompts effective to carry out one or more technical content transformations 526.

For example, decision node 528 determines when the response pertains to a weather forecast, and if it is determined that the response applies to a weather forecast, language model program 500 can provide prompts effective to carry out one or more weather transformations 530.

Once again, these decision nodes and conditional transformations are merely examples. While language model program 500 illustrated in FIG. 5A illustrates a single layer of conditions, it should be understood that the language model program can be deep tree of conditions that might have 2, 3, 4, 5, 10, 20, 30 or more layers of conditions.

After one or more transformations are performed the language model program 500 can return to block 506 to evaluate conditions that apply to other nodes. And this process can continue until there are not more transformations left to apply.

Language model program 500 is organized in this way such that revisions to language model program 500 are easy make, and the results of the revisions are targeted and predictable. For example, if improvements are desired in responses including named entities, revisions to the entity transformations 514, and other responses such as those that pertain to a weather forecast won't be affected since no changes are made to weather transformations 530. This allows quick iterations and testing to confirm that the changes to the transformations yield the desired responses.

Language model programs are not generally designed with such complexity because such a language model program potentially requires many calls to generative response engine 140, which, as noted below, results in slow response times and too much resource consumption. Language model programs are also not generally used for such a broad task set. Language model programs are generally used to achieve a particular targeted outcome in a more defined prompt domain.

FIG. 5B illustrates example prompts from a language model program to cause response transformations in accordance with some embodiments of the present technology.

For example, when language model program 500 determines at decision node 520 that style transformations should be applied, language model program 500 can apply style transformations 522. The style transformations 522 can be caused by prompts such as those illustrated in FIG. 5B. For example, prompts can cause the generative response engine 140 to revise responses to be more direct, to avoid saying "as an LLM", to avoid apologies in its response, and to make sure that responses do not include content that looks like an advertisement.

Figure 6:
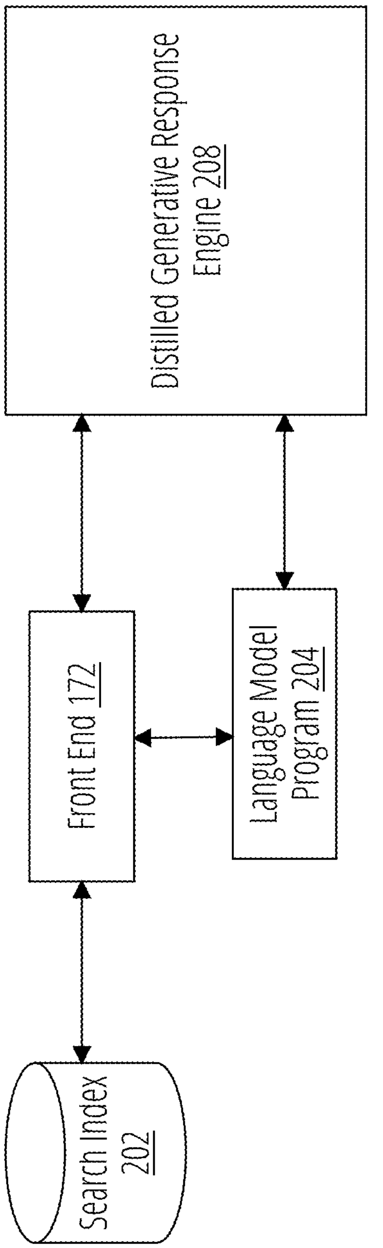
FIG. 6 is a block diagram illustrating an example system utilizing the distilled generative response engine to generate responses to search queries in accordance with some embodiments of the present technology.

FIG. 6 is a block diagram illustrating an example system utilizing the distilled generative response engine to generate responses to search queries in accordance with some embodiments of the present technology. Although the example system depicts particular system components and an arrangement of such components, this depiction is to facilitate a discussion of the present technology and should not be considered limiting unless specified in the appended claims. For example, some components that are illustrated as separate can be combined with other components, and some components can be divided into separate components.

In particular, FIG. 6 includes several elements extracted from FIG. 1 and FIG. 2 to better illustrate the present technology in a post-training, or inference, scenario.

For example, front end 172 is shown having an interface to search index 202. Search index 202 is an Internet search index such as might be used by a search engine to identify search results in response to a search query. Front end 172 can be adapted to receive a search query, send it to search index 202, and receive search results from search index 202. Although FIG. 2 illustrates that front end 172 interacts directly with search index 202, it will be appreciated by those of ordinary skill in the art that front end 172 might interact with one or more intermediate services in order to provide a search query to search index 202.

Front end 172 is further adapted to provide the search results to distilled generative response engine 208 to receive a response based on the search results, such as an answer to a question for which the search results are source material for formulating an answer to the question. In some embodiments, the search results might be provided to distilled generative response engine 208 through another service and may or might not use front end 172 as an intermediary. The key concept that is illustrated is that front end 172 receives a search query, and search results are obtained from search index 202 that are responsive to the search query. The search results are then used by distilled generative response engine 208 to generate a response to the search query.

Figure 7:
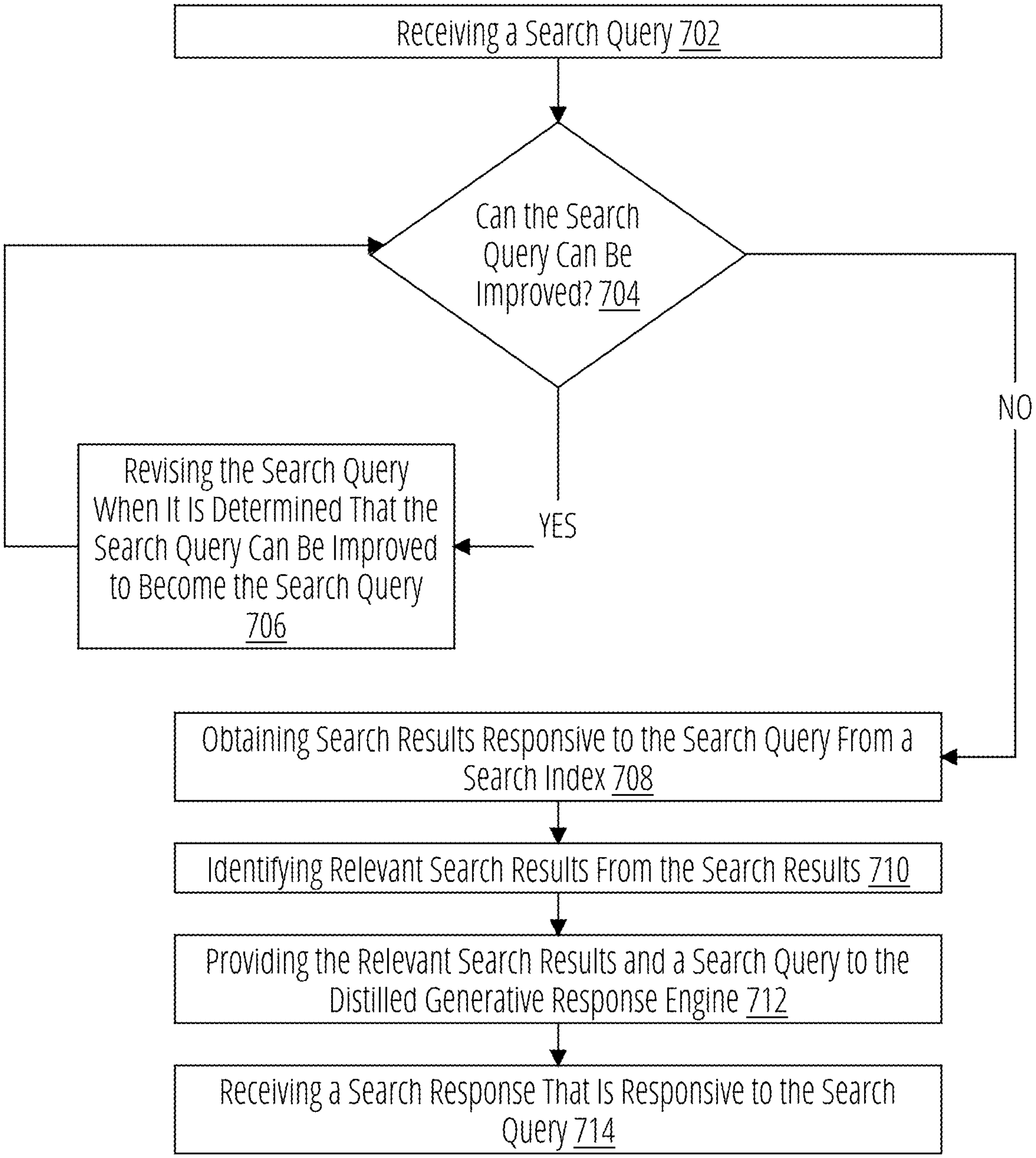
FIG. 7 illustrates an aspect of the subject matter in accordance with one embodiment.

As addressed above, distilled generative response engine 208 is a specialized model that is trained to provide high-quality responses based on search results more quickly than would be possible using generative response engine 140. FIG. 7 addresses the use of the system illustrated in FIG. 6 in more detail.

FIG. 7 illustrates an example routine for utilizing the distilled generative response engine to generate responses to search queries in accordance with some embodiments of the present technology. Although the example routine depicts a particular sequence of operations, the sequence may be altered without departing from the scope of the present disclosure. For example, some of the operations depicted may be performed in parallel, or might not be present, or in a different sequence that does not materially affect the function of the routine. In other examples, different components of an example device or system that implements the routine may perform functions at substantially the same time or in a specific sequence.

According to some examples, the method includes receiving a search query at block 702. For example, the front end 172 illustrated in FIG. 6 may receive a search query.

According to some examples, the method includes determining whether the search query can be improved at decision block 704. For example, the front end 172 in conjunction with distilled generative response engine 208 may determine whether the search query can be improved. In some embodiments, distilled generative response engine 208 may receive the search query and make an initial evaluation of whether the search query could be improved to result in a better search results. If so, the method includes revising the search query when it is determined that the search query can be improved to become the search query at block 706. For example, the front end 172, in conjunction with distilled generative response engine 208, may revise the search query when it is determined that the search query can be improved. The revised search query can become the search query and sent to search index 202.

While any step described with respect to the methods address herein might be skipped or not present, the revising the search query is, in. articular, not necessary for the practice of the present technology.

If the search query is acceptable, the unmodified search query is sent to search index 202.

According to some examples, the method includes obtaining search results responsive to the search query from a search index at block 708. For example, the search index 202 illustrated in FIG. 2 may obtain search results responsive to the search query from search index 202.

According to some examples, the method includes identifying relevant search results from the search results at block 710. For example, the distilled generative response engine 602 may identify relevant search results from the search results.

According to some examples, the method includes providing the relevant search results and the search query to the distilled generative response engine at block 712. For example, the distilled generative response engine 602 may use the relevant search results and the search query as input prompts to generate a response that is responsive to the search query. The response can include an answer to the search query with citations to webpages from which the answer was derived.

While block 710, block 712 have been described as separate steps, it should be appreciated that both of these actions are performed by distilled generative response engine 602, and it might not be possible to determine exactly how these steps are performed, and therefore these might not be performed as separate operations. In other words, block 710 and block 712 might be performed as part of one operation by distilled generative response engine 602.

By using distilled generative response engine 208 to generate the response, a quality response for the search query can be generated significantly faster than generative response engine 140 would be able to produce—especially if generative response engine 140 were to need to utilize the language model program for each response.

According to some examples, the method includes receiving a search response that is responsive to the search query at block 714. For example, the front end 172 illustrated in FIG. 1 may receive a search response that is responsive to the search query and present the response to the user. The search response was generated from the relevant search results and the search index, and the search response includes at least one citation to the relevant search results. The response may also include a listing of selected webpages that constitute some or all of the relevant search results.

Figure 8:
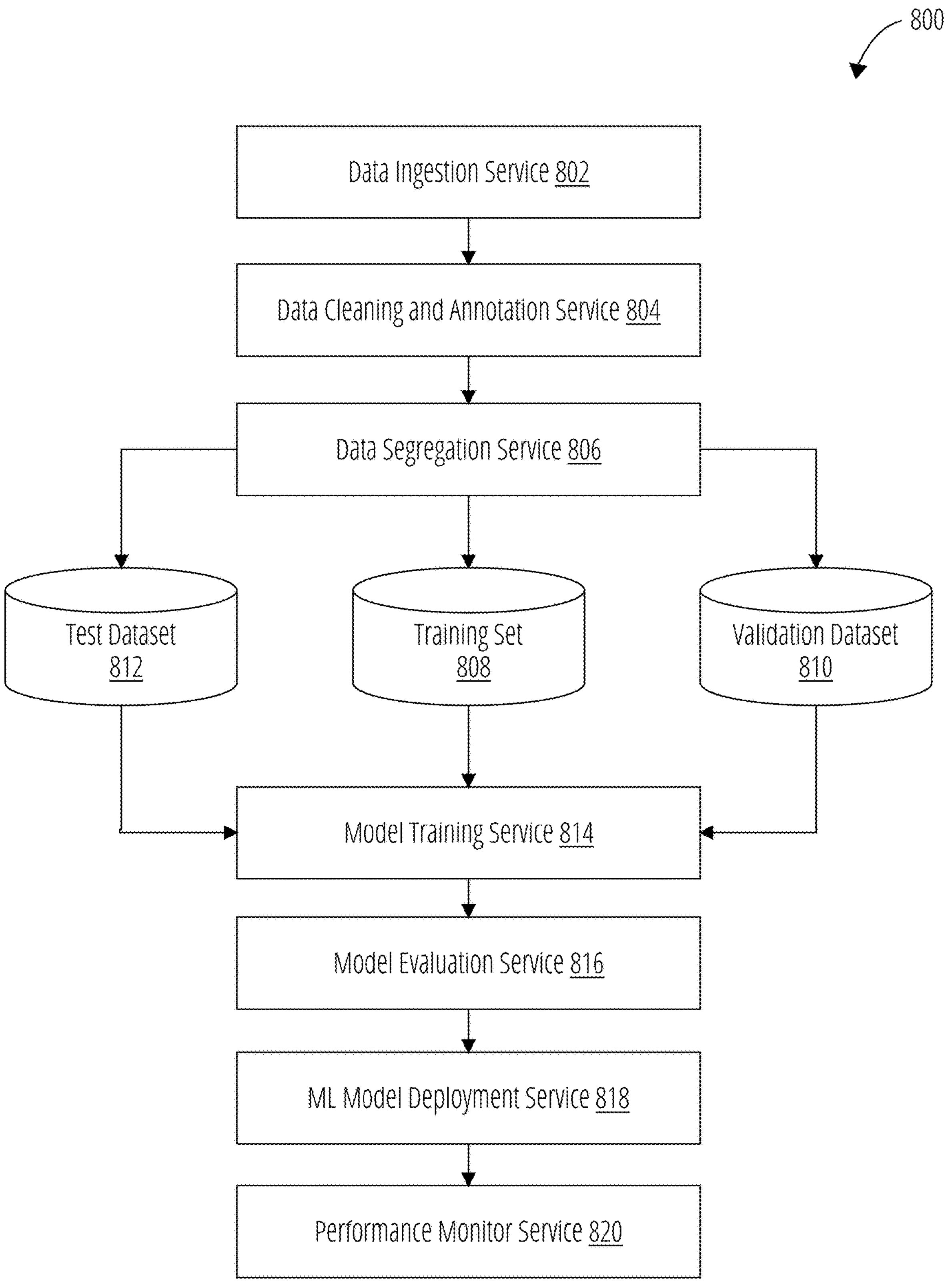
FIG. 8 illustrates an example lifecycle of an ML model in accordance with some embodiments of the present technology.

FIG. 8 illustrates an example lifecycle of a ML model in accordance with some embodiments of the present technology. The first stage of the lifecycle 800 of a ML model is a data ingestion service 802 to generate datasets described below. ML models require a significant amount of data for the various processes described in FIG. 8 and the data persisted without undertaking any transformation to have an immutable record of the original dataset. The data can be provided from third party sources such as publicly available dedicated datasets. The data ingestion service 802 provides a service that allows for efficient querying and end-to-end data lineage and traceability based on a dedicated pipeline for each dataset, data partitioning to take advantage of the multiple servers or cores, and spreading the data across multiple pipelines to reduce the overall time to reduce data retrieval functions.

In some cases, the data may be retrieved offline that decouples the producer of the data from the consumer of the data (e.g., an ML model training pipeline). For offline data production, when source data is available from the producer, the producer publishes a message and the data ingestion service 802 retrieves the data. In some examples, the data ingestion service 802 may be online and the data is streamed from the producer in real-time for storage in the data ingestion service 802.

After data ingestion service 802, a data preprocessing service preprocesses the data to prepare the data for use in the lifecycle 800 and includes at least data cleaning, data transformation, and data selection operations. The data cleaning and annotation service 804 removes irrelevant data (data cleaning) and general preprocessing to transform the data into a usable form. The data cleaning and annotation service 804 includes labelling of features relevant to the ML model. In some examples, the data cleaning and annotation service 804 may be a semi-supervised process performed by a ML to clean and annotate data that is complemented with manual operations such as labeling of error scenarios, identification of untrained features, etc.

After the data cleaning and annotation service 804, data segregation service 806 to separate data into at least a training set 808, a validation dataset 810, and a test dataset 812. Each of the training set 808, a validation dataset 810, and a test dataset 812 are distinct and do not include any common data to ensure that evaluation of the ML model is isolated from the training of the ML model.

The training set 808 is provided to a model training service 814 that uses a supervisor to perform the training, or the initial fitting of parameters (e.g., weights of connections between neurons in artificial neural networks) of the ML model. The model training service 814 trains the ML model based a gradient descent or stochastic gradient descent to fit the ML model based on an input vector (or scalar) and a corresponding output vector (or scalar).

After training, the ML model is evaluated at a model evaluation service 816 using data from the validation dataset 810 and different evaluators to tune the hyperparameters of the ML model. The predictive performance of the ML model is evaluated based on predictions on the validation dataset 810 and iteratively tunes the hyperparameters based on the different evaluators until a best fit for the ML model is identified. After the best fit is identified, the test dataset 812, or holdout data set, is used as a final check to perform an unbiased measurement on the performance of the final ML model by the model evaluation service 816. In some cases, the final dataset that is used for the final unbiased measurement can be referred to as the validation dataset and the dataset used for hyperparameter tuning can be referred to as the test dataset.

After the ML model has been evaluated by the model evaluation service 816, an ML model deployment service 818 can deploy the ML model into an application or a suitable device. The deployment can be into a further test environment such as a simulation environment, or into another controlled environment to further test the ML model.

After deployment by the ML model deployment service 818, a performance monitor service 820 monitors for performance of the ML model. In some cases, the performance monitor service 820 can also record additional transaction data that can be ingested via the data ingestion service 802 to provide further data, additional scenarios, and further enhance the training of ML models.

Figure 9:
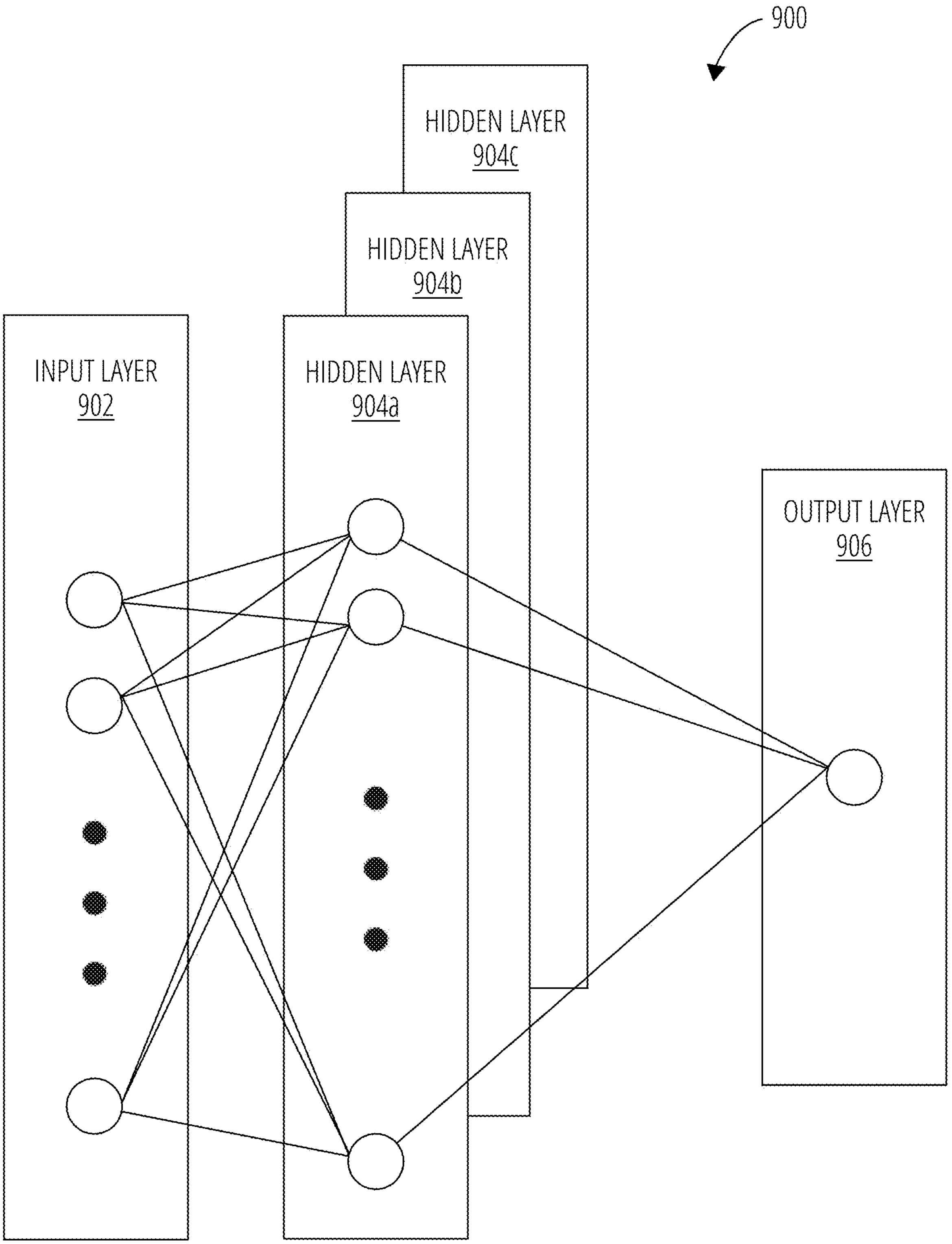
FIG. 9 illustrates an example of a deep learning neural network according to some embodiments of the present technology.

In FIG. 9, the disclosure now turns to a further discussion of models that can be used through the environments and techniques described herein. Specifically, FIG. 9 is an illustrative example of a deep learning neural network 900 that can be used to implement all or a portion of a generative response engine. The neural network 900 includes multiple hidden layers 904*a*, 904*b*, through 904*c*. The hidden layers 904*a* through 904*c* include "n" number of hidden layers, where "n" is an integer greater than or equal to one. The number of hidden layers can be made to include as many layers as needed for the given application. The neural network 900 further includes an output layer 906 that provides an output resulting from the processing performed by the hidden layers 904*a* through 904*c*. In one illustrative example, the output layer 906 can provide estimated treatment parameters, that can be used/ingested by a differential simulator to estimate a patient treatment outcome.

The neural network 900 is a multi-layer neural network of interconnected nodes. Each node can represent a piece of information. Information associated with the nodes is shared among the different layers and each layer retains information as information is processed. In some cases, the neural network 900 can include a feed-forward network, in which case there are no feedback connections where outputs of the network are fed back into itself. In some cases, the neural network 900 can include a recurrent neural network, which can have loops that allow information to be carried across nodes while reading in input.

Information can be exchanged between nodes through node-to-node interconnections between the various layers. Nodes of the input layer 902 can activate a set of nodes in the first hidden layer 904*a*. For example, as shown, each of the input nodes of the input layer 902 is connected to each of the nodes of the first hidden layer 904*a*. The nodes of the first hidden layer 904*a* can transform the information of each input node by applying activation functions to the input node information. The information derived from the transformation can then be passed to and can activate the nodes of the next hidden layer 904*b*, which can perform their own designated functions. Example functions include convolutional, up-sampling, data transformation, and/or any other suitable functions. The output of the hidden layer 904*b* can then activate nodes of the next hidden layer, and so on. The output of the last hidden layer 904*c* can activate one or more nodes of the output layer 906, at which an output is provided. In some cases, while nodes in the neural network 900 are shown as having multiple output lines, a node can have a single output and all lines shown as being output from a node represent the same output value.

In some cases, each node or interconnection between nodes can have a weight that is a set of parameters derived from the training of the neural network 900. Once the neural network 900 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 900 to be adaptive to inputs and able to learn as more and more data is processed.

The neural network 900 is pre-trained to process the features from the data in the input layer 902 using the different hidden layers 904*a* through 904*c* in order to provide the output through the output layer 906.

In some cases, the neural network 900 can adjust the weights of the nodes using a training process called backpropagation. A backpropagation process can include a forward pass, a loss function, a backward pass, and a weight update. The forward pass, loss function, backward pass, and parameter/weight update is performed for one training iteration. The process can be repeated for a certain number of iterations for each set of training data until the neural network 900 is trained well enough so that the weights of the layers are accurately tuned.

To perform training, a loss function can be used to analyze error in the output. Any suitable loss function definition can be used, such as a Cross-Entropy loss. Another example of a loss function includes the mean squared error (MSE), defined as E_total=Σ(½(target−output)^2). The loss can be set to be equal to the value of E_total.

The loss (or error) will be high for the initial training data since the actual values will be much different than the predicted output. The goal of training is to minimize the amount of loss so that the predicted output is the same as the training output. The neural network 900 can perform a backward pass by determining which inputs (weights) most contributed to the loss of the network, and can adjust the weights so that the loss decreases and is eventually minimized.

The neural network 900 can include any suitable deep network. One example includes a large language model (LLM), which is based on a transformer architecture of deep learning neural network. Another example is a convolutional Neural Network (CNN), which includes an input layer and an output layer, with multiple hidden layers between the input and out layers. The hidden layers of a CNN include a series of convolutional, nonlinear, pooling (for downsampling), and fully connected layers. The neural network 900 can include any other deep network other than an LLM or CNN, such as an autoencoder, Deep Belief Nets (DBNs), Recurrent Neural Networks (RNNs), among others.

As understood by those of skill in the art, machine-learning based classification techniques can vary depending on the desired implementation. For example, machine-learning classification schemes can utilize one or more of the following, alone or in combination: hidden Markov models; RNNs; CNNs; deep learning; Bayesian symbolic methods; Generative Adversarial Networks (GANs); support vector machines; image registration methods; and applicable rule-based systems. Where regression algorithms are used, they may include but are not limited to: a Stochastic Gradient Descent Regressor, a Passive Aggressive Regressor, etc.

Machine learning classification models can also be based on clustering algorithms (e.g., a Mini-batch K-means clustering algorithm), a recommendation algorithm (e.g., a Minwise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

Figure 10:
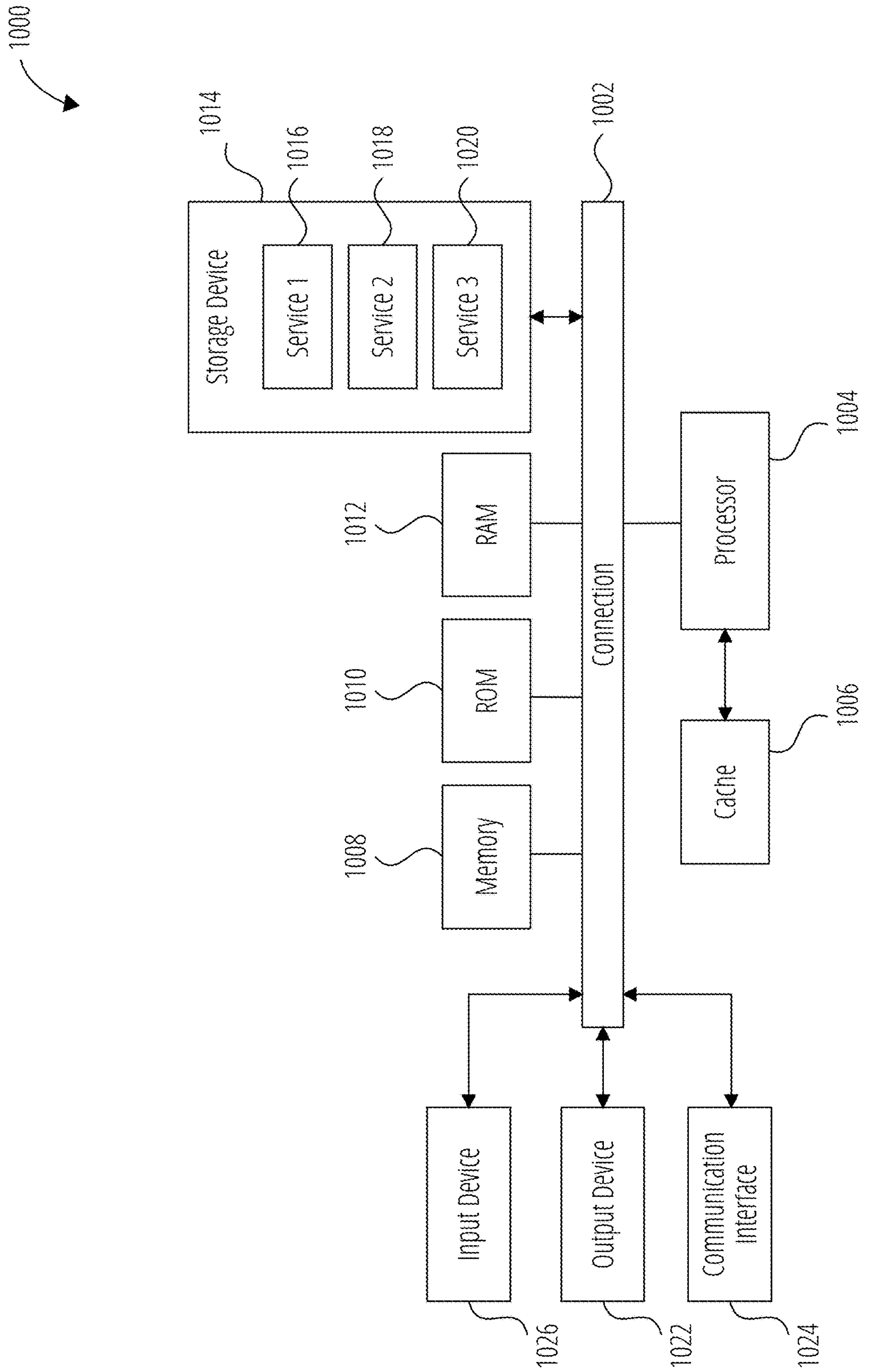
FIG. 10 shows an example of a system for implementing certain embodiments of the present technology.

FIG. 10 shows an example of computing system 1000, which can be, for example, any computing device making up any engine illustrated in FIG. 1 or any component thereof in which the components of the system are in communication with each other using connection 1002. Connection 1002 can be a physical connection via a bus, or a direct connection into processor 1004, such as in a chipset architecture. Connection 1002 can also be a virtual connection, networked connection, or logical connection.

In some embodiments, computing system 1000 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 1000 includes at least one processing unit (CPU or processor) 1004 and connection 1002 that couples various system components including system memory 1008, such as read-only memory (ROM) 1010 and random access memory (RAM) 1012 to processor 1004. Computing system 1000 can include a cache of high-speed memory 1006 connected directly with, in close proximity to, or integrated as part of processor 1004.

Processor 1004 can include any general purpose processor and a hardware service or software service, such as services 1016, 1018, and 1020 stored in storage device 1014, configured to control processor 1004 as well as a special-purpose processor where software instructions are incorporated into the actual processor design. Processor 1004 may essentially be a completely self-contained computing system, containing multiple cores or processors, a bus, memory controller, cache, etc. A multi-core processor may be symmetric or asymmetric.

To enable user interaction, computing system 1000 includes an input device 1026, which can represent any number of input mechanisms, such as a microphone for speech, a touch-sensitive screen for gesture or graphical input, keyboard, mouse, motion input, speech, etc. Computing system 1000 can also include output device 1022, which can be one or more of a number of output mechanisms known to those of skill in the art. In some instances, multimodal systems can enable a user to provide multiple types of input/output to communicate with computing system 1000. Computing system 1000 can include communication interface 1024, which can generally govern and manage the user input and system output. There is no restriction on operating on any particular hardware arrangement, and therefore the basic features here may easily be substituted for improved hardware or firmware arrangements as they are developed.

Storage device 1014 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 1014 can include software services, servers, services, etc., that when the code that defines such software is executed by the processor 1004, it causes the system to perform a function. In some embodiments, a hardware service that performs a particular function can include the software component stored in a computer-readable medium in connection with the necessary hardware components, such as processor 1004, connection 1002, output device 1022, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

ASPECTS

The present technology includes computer-readable storage mediums for storing instructions, and systems for executing any one of the methods embodied in the instructions addressed in the aspects of the present technology presented below:

Aspect 1. A method comprising: providing an initial prompt to a generative response engine along with at least one guiding prompt from a language model program; receiving a final response from the generative response engine, wherein the generative response engine was guided to generating the final response by the at least one guiding prompt from language model program; and performing a language model distillation by training the generative response engine to produce the final response from the initial prompt without the benefit of the at least one guiding prompt from the language model program, wherein the final response is used as distillation data, wherein the result of the language model distillation is a distilled generative response engine.

Aspect 2. The method of aspect 1, wherein the language model program is organized into a collection of conditional transformations.

Aspect 3. The method of any one of aspects 1-2, wherein the language model program is configured to iterate through nodes in the collection of conditional transformations to determine if a condition applies, and when the condition applies, applying respective conditional transformation relevant to the condition.

Aspect 4. The method of any one of aspects 1-3, wherein the language model program completes when transformations of the relevant conditions have been applied.

Aspect 5. The method of any one of aspects 1-4, further comprising: receiving a search query; determining whether the search query can be improved; revising the search query when it is determined that the search query can be improved to become the search query.

Aspect 6. The method of any one of aspects 1-5, further comprising: obtaining search results from a search index; providing the search results and the search query to the distilled generative response engine; and receiving a search response that is responsive to the search query, wherein the search response is generated from the relevant search results, and the search index, wherein the search response includes at least one citation to the relevant search results.

Aspect 7. The method of any one of aspects 1-6, wherein the search response is generated by the distilled generative response engine.

Aspect 8. A method comprising: receiving a search query; obtaining search results from a search index; providing the search results and the search query to the distilled generative response engine; and receiving a search response that is responsive to the search query, wherein the search response is generated from the relevant search results and the search index, wherein the search response includes at least one citation to the relevant search results.

Aspect 9. The method of aspect 8, further comprising: prior to obtaining the search results from the search index, determining whether the search query can be improved; revising the search query when it is determined that the search query can be improved.

What is claimed is:

1. A method comprising:

selecting sources from search results resulting from a search query;

writing headers to be used by a generative response engine when generating a final response to the search query;

evaluating conditions in a language model program;

selecting at least one guiding prompt associated with a condition among the conditions in the language model program when the condition is relevant to the search query or selected sources;

providing, to the generative response engine, a prompt that is made up of:

the search query and the sources from the search results that are responsive to the search query, the at least one guiding prompt from the language model program, wherein the at least one guiding prompt is configured to guide the generative response engine to present the final response to the search query including the headers;

receiving the final response from the generative response engine, wherein the generative response engine was guided to generate the final response by the at least one guiding prompt from the language model program; and performing a language model distillation by training the generative response engine to produce the final response from the prompt without the benefit of the at least one guiding prompt from the language model program, wherein the final response is used as distillation data, wherein the result of the language model distillation is a distilled generative response engine that generates responses to search queries.

2. The method of claim 1, wherein the language model program provides a tree of prompts and based on an initial response from the generative response engine using one of the tree of prompts from the language model program as the guiding prompt.

3. The method of claim 1, further comprising:

determining that the language model program is complete when the language model program does not contain additional relevant guiding prompts to provide to the generative response engine.

4. The method of claim 1, wherein the language model program is configured to iterate through nodes in a collection of conditional transformations to determine if the condition applies, and when the condition applies, applying respective conditional transformation relevant to the condition, wherein the respective conditional transformation is used to create the guiding prompt.

5. The method of claim 4, wherein the language model program completes when transformations of the relevant conditions have been applied.

6. The method of claim 1, further comprising:

receiving the search query;

determining whether the search query can be improved;

revising the search query when it is determined that the search query can be improved to become the search query.

7. The method of claim 6, further comprising:

obtaining the search results from a search index;

providing the search results and the search query to the distilled generative response engine; and receiving a search response that is responsive to the search query, wherein the search response is generated from the search results and the search index, wherein the search response includes at least one citation to the search results.

8. The method of claim 7, wherein the search response is generated by the distilled generative response engine.

9. A computing system comprising:

a processor; and a memory storing instructions that, when executed by the processor, configure the computing system to:

selecting sources from search results resulting from a search query:

writing headers to be used by a generative response engine when generating a final response to the search query;

evaluating conditions in a language model program;

selecting at least one guiding prompt associated with a condition among the conditions in the language model program when the condition is relevant to the search query or selected sources;

provide, to the generative response engine, a prompt that is made up of:

the search query and the sources from the search results that are responsive to the search query, the at least one guiding prompt from the language model program, wherein the at least one guiding prompt is configured to guide the generative response engine to present the final response to the search query including the headers;

receive the final response from the generative response engine, wherein the generative response engine was guided to generate the final response by the at least one guiding prompt from the language model program; and perform a language model distillation by training the generative response engine to produce the final response from the prompt without the benefit of the at least one guiding prompt from the language model program, wherein the final response is used as distillation data, wherein the result of the language model distillation is a distilled generative response engine that generates responses to search queries.

10. The computing system of claim 9, wherein the language model program is organized into a collection of conditional transformations.

11. The computing system of claim 10, wherein the language model program is configured to iterate through nodes in the collection of conditional transformations to determine if the condition applies, and when the condition applies, apply respective conditional transformation relevant to the condition.

12. The computing system of claim 11, wherein the language model program completes when transformations of the relevant conditions have been applied.

13. The computing system of claim 9, wherein the instructions further configure the computing system to:

receive the search query;

determine whether the search query can be improved;

revise the search query when it is determined that the search query can be improved to become the search query.

14. The computing system of claim 13, wherein the instructions further configure the computing system to:

obtain the search results from a search index;

provide the search results and the search query to the distilled generative response engine; and receive a search response that is responsive to the search query, wherein the search response is generated from the search results and the search index, wherein the search response includes at least one citation to the search results.

15. The computing system of claim 14, wherein the search response is generated by the distilled generative response engine.

16. A non-transitory computer-readable storage medium comprising instructions stored thereon that when executed by at least one processor, cause the at least one processor to:

selecting sources from search results resulting from a search query;

writing headers to be used by a generative response engine when generating a final response to the search query;

evaluating conditions in a language model program;

selecting at least one guiding prompt associated with a condition among the conditions in the language model program when the condition is relevant to the search query or selected sources;

provide, to the generative response engine, a prompt that is made up of:

the search query and the sources from the search results that are responsive to the search query, the at least one guiding prompt from the language model program, wherein the at least one guiding prompt is configured to guide the generative response engine to present the final response to the search query including the headers;

receive the final response from the generative response engine, wherein the generative response engine was guided to generate the final response by the at least one guiding prompt from the language model program; and perform a language model distillation by training the generative response engine to produce the final response from the prompt without the benefit of the at least one guiding prompt from the language model program, wherein the final response is used as distillation data, wherein the result of the language model distillation is a distilled generative response engine that generates responses to search queries.

17. The computer-readable storage medium of claim 16, wherein the instructions further configure the at least one processor to:

receive the search query;

determine whether the search query can be improved;

revise the search query when it is determined that the search query can be improved to become the search query.

18. The computer-readable storage medium of claim 17, wherein the instructions further configure the at least one processor to:

obtain the search results from a search index;

provide the search results and the search query to the distilled generative response engine; and receive a search response that is responsive to the search query, wherein the search response is generated from the search results and the search index, wherein the search response includes at least one citation to the search results.

19. The computer-readable storage medium of claim 16, wherein the language model program is organized into a collection of conditional transformations.

20. The computer-readable storage medium of claim 19, wherein the language model program is configured to iterate through nodes in the collection of conditional transformations to determine if the condition applies, and when the condition applies, apply respective conditional transformation relevant to the condition.

21. The computer-readable storage medium of claim 20, wherein the language model program completes when transformations of the relevant conditions have been applied.

* * * * *